9169X
O. B. Percival,
Gimlet.
Patented Oct. 14, 1835.
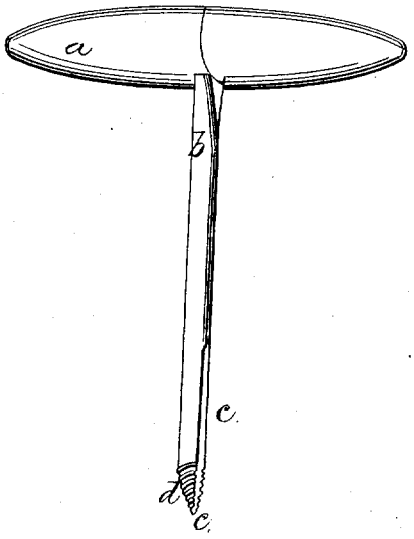
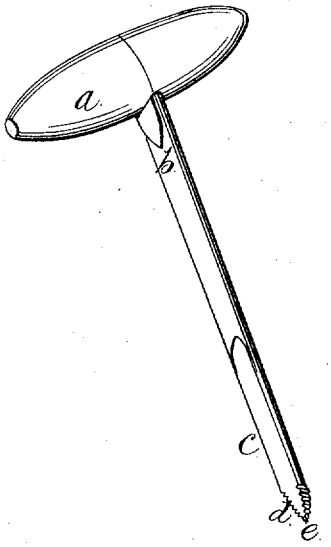
AM. PHOTO-LITHO. CO. N.Y. (OSBORNE'S PROCESS)

Oct. 14. 1835 14 10-14 1835 73

9169X

Orville B. Percival. of East Haddam. Connecticut,

Letters Patent.

The schedule referred to in these Letters Patent and making part of the same containing a description in the words of the said Orville B. Percival himself of his improvement in Gimblets and Augers.

To all to whom these presents shall come,

Know ye that I Orville B. Percival, of East Haddam in the County of Middlesex, and State of Connecticut, have invented a new and useful improvement on the common pod Gimblet for the purpose of boring by extending the pod into the screw and nearly or quite to the point thereof, thus enabling the screw to cut its passage, instead of forcing its way through the material like a wedge; and that the following is a full and Exact description of the improvement, construction and operation of the same as invented by me, —

The Gimblet may be constructed in the same form and of the same materials as the common pod Gimblet — excepting that the pod is extended through the screw to or near the point of the gimblet tapering as the screw tapers, the screw being upon the back of the pod, — The handle may be made of box or other suitable wood, the shank may be made of iron or steel, The gimblet as thus improved bores easier, is less liable to split the wood, makes a smoother hole than the common pod Gimblet and at the same time the handle of the Gimblet as thus improved is less liable to split or break. — Augers may be constructed in the same manner and upon the same principle. — I claim as my improvement or invention, the extension of the pod through the screw to or near the point of the Gimblet or Auger, tapering as the screw tapers, the screw being upon the back of the pod, East Haddam September 22d. 1835.

Orville B. Percival

Witness

Eliphalet A. Bulkley

M. C. Warner

E.o. Ch.f.W.

364.20

(Patented October 14. 1835)

(Drawing)